United States Patent
Wells

(10) Patent No.: US 12,400,158 B2
(45) Date of Patent: *Aug. 26, 2025

(54) SYSTEMS AND METHODS FOR ROBOT FLEET MANAGEMENT

(71) Applicant: Sanctuary Cognitive Systems Corporation, Vancouver (CA)

(72) Inventor: James Gordon Wells, North Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,616

(22) Filed: Oct. 18, 2024

(65) Prior Publication Data

US 2025/0130542 A1    Apr. 24, 2025

Related U.S. Application Data

(60) Provisional application No. 63/544,800, filed on Oct. 19, 2023.

(51) Int. Cl.
*G05B 15/02* (2006.01)
*G06Q 10/0631* (2023.01)
(Continued)

(52) U.S. Cl.
CPC ......... *G06Q 10/0631* (2013.01); *G05B 15/02* (2013.01); *B25J 9/1661* (2013.01); *G05D 1/648* (2024.01); *G06Q 10/06311* (2013.01)

(58) Field of Classification Search
CPC ....... G05B 15/02; G05D 1/648; B25J 9/1661; G06Q 10/06311
See application file for complete search history.

(56) References Cited

U.S. PATENT DOCUMENTS 9,684,565 B2 *   6/2017   Hazlewood ......... G06F 11/1451
12,204,543 B2 *   1/2025   Cella ................... G06Q 10/087
(Continued)

FOREIGN PATENT DOCUMENTS

WO    2022133330 A1    6/2022

OTHER PUBLICATIONS

Souto et al., Fleet Management System for Autonomous Mobile Robots in Secure Shop-floor Environments, 2021, IEEE, p. 1-6 (Year: 2011).*

(Continued)

*Primary Examiner* — McDieunel Marc
(74) *Attorney, Agent, or Firm* — Thomas Mahon

(57) ABSTRACT

In an implementation of a method of operation of a robot fleet management system, the robot fleet management system accesses a set of tasks available to be performed by a fleet of robots, accesses a respective power consumption for each task from the set of tasks, and accesses a respective power state of each robot in the fleet. The robot fleet management system allocates a selected robot to a selected task, based at least in part on the power state of at least the selected robot and the power consumption for at least the selected task. The power consumption is determined by the robot fleet management system and/or be provided by the task provider. The set of tasks includes tethered and untethered tasks. The robot fleet management system allocates the selected robot to an untethered task after determining the selected robot has sufficient power to complete the untethered task.

20 Claims, 13 Drawing Sheets

(51) Int. Cl.
  *B25J 9/16* (2006.01)
  *G05D 1/648* (2024.01)

(56) References Cited

U.S. PATENT DOCUMENTS

| | | | |
|---|---|---|---|
| 2022/0269284 | A1 | 8/2022 | Chen et al. |
| 2022/0288645 | A1 | 9/2022 | Memon et al. |
| 2022/0317661 | A1 | 10/2022 | Kaehler |
| 2023/0259878 | A1 | 8/2023 | Jacquemart et al. |
| 2024/0294220 | A1* | 9/2024 | Gildert ................ B62D 57/028 |

OTHER PUBLICATIONS

Turi et al., Extending a Refinement Acting Engine for Fleet Management: Concurrency and Resources, 2022, IEEE, p. 1430-1434 (Year: 2022).*

Oliveira et al., On the Effect of Heterogeneous Robot Fleets on Smart Warehouses' Order Time, Energy, and Operating Costs, 2022, IEEE, p. 1-8 (Year: 2022).*

Oliveira et al., Efficient Task Allocation in Smart Warehouses with Multi-Delivery Stations and Heterogeneous Robots, 2022, IEEE, p. 1-8 (Year: 2022).*

Kumar et al., Managing a fleet of autonomous mobile robots (AMR) using cloud robotics platform, 2017, IEEE, p. 1-6 (Year: 2017).*

Jost et al., Safe Human-Robot-Interaction in Highly Flexible Warehouses using Augmented Reality and Heterogenous Fleet Management System, 2018, IEEE, p. 256-260 (Year: 2018).*

Gerland, Intelligence on board: modern approach to transit fleet management, 1994, IEEE, p. 557-562 (Year: 1994).*

Ismail et al., Cobot Fleet Management System Using Cloud and Edge Computing, 2020, IEEE, p. 1-5 (Year: 2020).*

International Search Report, PCT/CA2024/051384, Jan. 21, 2025.

Written Opinion of the International Searching Authority, PCT/CA2024/051384, Jan. 21, 2025.

* cited by examiner

SYSTEMS AND METHODS FOR ROBOT FLEET MANAGEMENT

TECHNICAL FIELD

The present systems and methods generally relate to robot fleet management, and particularly relate to efficient allocation of mobile robots to tethered and untethered tasks in an environment.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example. In various of these applications, robots can be allocated to a task.

Some robots require user input, and can be operated by humans. Other robots have a degree of autonomy, and can operate, in at least some situations, without human intervention. Some autonomous or semi-autonomous robots are designed to mimic human behavior. Autonomous or semi-autonomous robots can be particularly useful in applications where robots (for example, general purpose robots) are needed to work for an extended time without operator intervention, to navigate within their operating environment, and/or to adapt to changing circumstances.

BRIEF SUMMARY

A method of operation of a robot fleet management system may be summarized as comprising accessing (e.g., receiving), by the robot fleet management system, a set of tasks available to be performed by a fleet of robots, accessing (e.g., determining), by the robot fleet management system, a respective power consumption for each task from the set of tasks, accessing, by the robot fleet management system, a respective power state of each robot in the fleet of robots, and allocating, by the robot fleet management system, a first robot in the fleet of robots to a first task from the set of tasks, based at least in part on the power state of at least the first robot and the power consumption for at least the first task.

In some implementations, allocating, by the robot fleet management system, a first robot in the fleet of robots to a first task from the set of tasks includes allocating, by the robot fleet management system, a first robot in the fleet of robots to a first task from the set of tasks based at least in part on the respective power state of each robot in the fleet of robots and the respective power consumption for each task from the set of tasks.

In some implementations, accessing (e.g., receiving), by the robot fleet management system, a set of tasks available to be performed by a fleet of robots includes accessing (e.g., receiving), by the robot fleet management system, a set of tasks comprising at least one tethered task and at least one untethered task.

Allocating, by the robot fleet management system, a first robot in the fleet of robots to a first task from the set of tasks based at least in part on the power state of at least the first robot and the power consumption for at least the first task may include determining, by the robot fleet management system, the first robot has sufficient power to complete an untethered task selected from the at least one untethered task, and allocating, by the robot fleet management system, the first robot to the selected untethered task.

Allocating, by the robot fleet management system, a first robot in the fleet of robots to a first task from the set of tasks, based at least in part on the power state of at least the first robot and the power consumption for at least the first task may include determining, by the robot fleet management system, the power state of the first robot is above an upper threshold, and allocating, by the robot fleet management system, the first robot in the fleet of robots to an untethered task selected from the at least one untethered task.

Allocating, by the robot fleet management system, a first robot in the fleet of robots to a first task from the set of tasks based at least in part on the power state of at least the first robot and the power consumption for at least the first task may include determining, by the robot fleet management system, the first robot has insufficient power to complete an untethered task selected from the at least one untethered task, and allocating, by the robot fleet management system, the first robot to a tethered task selected from the at least one tethered task.

Allocating, by the robot fleet management system, a first robot in the fleet of robots to a first task from the set of tasks based at least in part on the power state of at least the first robot and the power consumption for at least the first task may include determining, by the robot fleet management system, the first robot has insufficient power to complete any untethered task selected from the at least one untethered task, and allocating, by the robot fleet management system, the first robot to a tethered task selected from the at least one tethered task.

Allocating, by the robot fleet management system, a first robot in the fleet of robots to a first task from the set of tasks, based at least in part on the power state of at least the first robot and the power consumption for at least the first task may include determining, by the robot fleet management system, the power state of the first robot is below a lower threshold, and allocating, by the robot fleet management system, the first robot in the fleet of robots to a tethered task selected from the at least one tethered task.

The method may further comprise initiating, by the robot fleet management system, a replenishment of a power source of the first robot during performance of a tethered task by the first robot.

In some implementations, accessing (e.g., determining), by the robot fleet management system, a respective power consumption for each task from the set of tasks includes accessing (e.g., determining), by the robot fleet management system, a respective power consumption based at least in part on a power anticipated to be drawn by a robot in the fleet of robots from a power source to complete each task from the set of tasks. Accessing (e.g., determining), by the robot fleet management system, a respective power consumption based at least in part on a power anticipated to be drawn by a robot in the fleet of robots from a power source to complete each task from the set of tasks may include accessing (e.g., determining), by the robot fleet management system, a respective power consumption based at least in part on an anticipated power to be drawn from a battery to complete each task from the set of tasks, the battery onboard a battery-powered robot in the fleet of robots.

In some implementations, accessing (e.g., determining), by the robot fleet management system, a respective power consumption for each task from the set of tasks includes accessing (e.g., determining), by the robot fleet management system, a respective power consumption based at least in part on respective historical power consumption data for each task from the set of tasks.

In some implementations, accessing (e.g., determining), by the robot fleet management system a respective power consumption for each task from the set of tasks includes accessing (e.g., determining), by the robot fleet management system, at least one of a respective power consumption score and a power consumption category for each task from the set of tasks.

In some implementations, accessing, by the robot fleet management system, a respective power state of each robot in the fleet of robots includes accessing, by the robot fleet management system, a respective state of charge of a battery onboard each robot in the fleet of robots.

In some implementations, accessing, by the robot fleet management system, a respective power state of each robot in the fleet of robots includes accessing (e.g., determining) a respective power state of each robot based at least in part on a respective cumulative power consumption of each robot for a respective at least one completed task of the at least one untethered tasks.

In some implementations, the method further comprises allocating, by the robot fleet management system, a second robot in the fleet of robots to a second task from the set of tasks based at least in part on the respective power state of at least the second robot and the respective power consumption for at least the second task. Allocating, by the robot fleet management system, a second robot in the fleet of robots to a second task from the set of tasks may include allocating, by the robot fleet management system, a second robot in the fleet of robots to a second task from the set of tasks based at least in part on the respective power state of each robot in the fleet of robots and the respective power consumption for each task from the set of tasks.

Accessing (e.g., receiving), by the robot fleet management system, a set of tasks available to be performed by a fleet of robots may include accessing (e.g., receiving), by the robot fleet management system, a set of tasks comprising at least one tethered task and at least one untethered task, and allocating, by the robot fleet management system, a first robot in the fleet of robots to a first task from the set of tasks and allocating, by the robot fleet management system, a second robot in the fleet of robots to a second task from the set of tasks may include accessing (e.g., determining), by the robot fleet management system, the power state of the first robot is lower than the power state of the second robot, allocating, by the robot fleet management system, a tethered task selected from the at least one tethered task to the first robot, and allocating, by the robot fleet management system, an untethered task selected from the at least one untethered task to the second robot.

In some implementations, allocating, by the robot fleet management system, a first robot in the fleet of robots to a first task from the set of tasks, based at least in part on the power state of at least the first robot and the power consumption for at least the first task includes allocating, by the robot fleet management system, the first robot to the first task based at least in part on at least one of a priority of the first task relative to other tasks from the set of tasks and a maintenance condition of the first robot.

In some implementations, allocating, by the robot fleet management system, a first robot in the fleet of robots to a first task from the set of tasks, based at least in part on the power state of at least the first robot and the power consumption for at least the first task includes allocating, by the robot fleet management system, a first task from the set of tasks to a first robot of the fleet of robots in real-time.

In some implementations, accessing (e.g., receiving), by the robot fleet management system, a set of tasks available to be performed by a fleet of robots includes accessing (e.g., receiving), by the robot fleet management system a set of tasks available to be performed in a common environment by a fleet of robots deployed in the common environment.

In some implementations, accessing (e.g., receiving), by the robot fleet management system, a set of tasks available to be performed by a fleet of robots includes accessing (e.g., receiving) a set of tasks comprising a first set of tasks available to be performed in a first environment by at least a first robot in the fleet of robots, and a second set of tasks available to be performed in a second environment by at least a second robot in the fleet of robots.

A robot fleet management system may be summarized as comprising at least one processor and at least one non-transitory processor-readable storage medium communicatively coupled to the at least one processor, the at least one non-transitory processor-readable storage medium storing processor-executable instructions and/or data that, when executed by the at least one processor, cause the robot fleet management system to perform a method of operation of the robot fleet management system, wherein the method of operation includes accessing (e.g., receiving), by the robot fleet management system, a list or set of tasks available to be performed by a fleet of robots, accessing (e.g., determining), by the robot fleet management system, a respective power consumption for each task from the list or set of tasks, accessing, by the robot fleet management system, a respective power state of each robot in the fleet of robots, and allocating, by the robot fleet management system, a first robot in the fleet of robots to a first task from the list or set of tasks, based at least in part on the power state of at least the first robot and the power consumption for at least the first task.

In some implementations, allocating, by the robot fleet management system, a first robot in the fleet of robots to a first task from the set of tasks includes allocating, by the robot fleet management system, a first robot in the fleet of robots to a first task from the set of tasks based at least in part on the respective power state of each robot in the fleet of robots and the respective power consumption for each task from the set of tasks.

In some implementations, accessing (e.g., receiving), by the robot fleet management system, a set of tasks available to be performed by a fleet of robots includes accessing (e.g., receiving), by the robot fleet management system, a set of tasks comprising at least one tethered task and at least one untethered task.

Allocating, by the robot fleet management system, a first robot in the fleet of robots to a first task from the set of tasks based at least in part on the power state of at least the first robot and the power consumption for at least the first task may include determining, by the robot fleet management system, the first robot has sufficient power to complete an untethered task selected from the at least one untethered task, and allocating, by the robot fleet management system, the first robot to the selected untethered task.

Allocating, by the robot fleet management system, a first robot in the fleet of robots to a first task from the set of tasks, based at least in part on the power state of at least the first robot and the power consumption for at least the first task may include determining, by the robot fleet management system, the power state of the first robot is above an upper threshold, and allocating, by the robot fleet management system, the first robot in the fleet of robots to an untethered task selected from the at least one untethered task.

Allocating, by the robot fleet management system, a first robot in the fleet of robots to a first task from the set of tasks based at least in part on the power state of at least the first robot and the power consumption for at least the first task may include determining, by the robot fleet management system, the first robot has insufficient power to complete an untethered task selected from the at least one untethered task, and allocating, by the robot fleet management system, the first robot to a tethered task selected from the at least one tethered task.

Allocating, by the robot fleet management system, a first robot in the fleet of robots to a first task from the set of tasks based at least in part on the power state of at least the first robot and the power consumption for at least the first task may include determining, by the robot fleet management system, the first robot has insufficient power to complete any untethered task selected from the at least one untethered task, and allocating, by the robot fleet management system, the first robot to a tethered task selected from the at least one tethered task.

Allocating, by the robot fleet management system, a first robot in the fleet of robots to a first task from the set of tasks, based at least in part on the power state of at least the first robot and the power consumption for at least the first task may include determining, by the robot fleet management system, the power state of the first robot is below a lower threshold, and allocating, by the robot fleet management system, the first robot in the fleet of robots to a tethered task selected from the at least one tethered task.

The method of operation may further comprise initiating, by the robot fleet management system, a replenishment of a power source of the first robot during performance of a tethered task by the first robot.

In some implementations, accessing (e.g., determining), by the robot fleet management system, a respective power consumption for each task from the set of tasks includes accessing (e.g., determining), by the robot fleet management system, a respective power consumption based at least in part on a power anticipated to be drawn by a robot in the fleet of robots from a power source to complete each task from the set of tasks. Accessing (e.g., determining), by the robot fleet management system, a respective power consumption based at least in part on a power anticipated to be drawn by a robot in the fleet of robots from a power source to complete each task from the set of tasks may include accessing (e.g., determining), by the robot fleet management system, a respective power consumption based at least in part on an anticipated power to be drawn from a battery to complete each task from the set of tasks, the battery onboard a battery-powered robot in the fleet of robots.

In some implementations, accessing (e.g., determining), by the robot fleet management system, a respective power consumption for each task from the set of tasks includes accessing (e.g., determining), by the robot fleet management system, a respective power consumption based at least in part on respective historical power consumption data for each task from the set of tasks.

In some implementations, accessing (e.g., determining), by the robot fleet management system a respective power consumption for each task from the set of tasks includes accessing (e.g., determining), by the robot fleet management system, at least one of a respective power consumption score and a power consumption category for each task from the set of tasks.

In some implementations, accessing, by the robot fleet management system, a respective power state of each robot in the fleet of robots includes accessing, by the robot fleet management system, a respective state of charge of a battery onboard each robot in the fleet of robots.

In some implementations, accessing, by the robot fleet management system, a respective power state of each robot in the fleet of robots includes accessing (e.g., determining) a respective power state of each robot based at least in part on a respective cumulative power consumption of each robot for a respective at least one completed task of the at least one untethered tasks.

In some implementations, the method of operation further comprises allocating, by the robot fleet management system, a second robot in the fleet of robots to a second task from the set of tasks based at least in part on the respective power state of at least the second robot and the respective power consumption for at least the second task. Allocating, by the robot fleet management system, a second robot in the fleet of robots to a second task from the set of tasks may include allocating, by the robot fleet management system, a second robot in the fleet of robots to a second task from the set of tasks based at least in part on the respective power state of each robot in the fleet of robots and the respective power consumption for each task from the set of tasks.

Accessing (e.g., receiving), by the robot fleet management system, a set of tasks available to be performed by a fleet of robots may include accessing (e.g., receiving), by the robot fleet management system, a set of tasks comprising at least one tethered task and at least one untethered task, and allocating, by the robot fleet management system, a first robot in the fleet of robots to a first task from the set of tasks and allocating, by the robot fleet management system, a second robot in the fleet of robots to a second task from the set of tasks may include determining, by the robot fleet management system, the power state of the first robot is lower than the power state of the second robot, allocating, by the robot fleet management system, a tethered task selected from the at least one tethered task to the first robot, and allocating, by the robot fleet management system, an untethered task selected from the at least one untethered task to the second robot.

In some implementations, allocating, by the robot fleet management system, a first robot in the fleet of robots to a first task from the set of tasks, based at least in part on the power state of at least the first robot and the power consumption for at least the first task includes allocating, by the robot fleet management system, the first robot to the first task based at least in part on at least one of a priority of the first task relative to other tasks from the set of tasks and a maintenance condition of the first robot.

In some implementations, allocating, by the robot fleet management system, a first robot in the fleet of robots to a first task from the set of tasks, based at least in part on the power state of at least the first robot and the power consumption for at least the first task includes allocating, by the robot fleet management system, a first task from the set of tasks to a first robot of the fleet of robots in real-time.

In some implementations, accessing (e.g., receiving), by the robot fleet management system, a set of tasks available to be performed by a fleet of robots includes accessing (e.g., receiving), by the robot fleet management system a set of tasks available to be performed in a common environment by a fleet of robots deployed in the common environment.

In some implementations, accessing (e.g., receiving), by the robot fleet management system, a set of tasks available to be performed by a fleet of robots includes accessing (e.g., receiving) a set of tasks comprising a first set of tasks available to be performed in a first environment by at least a first robot in the fleet of robots, and a second set of tasks available to be performed in a second environment by at least a second robot in the fleet of robots.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
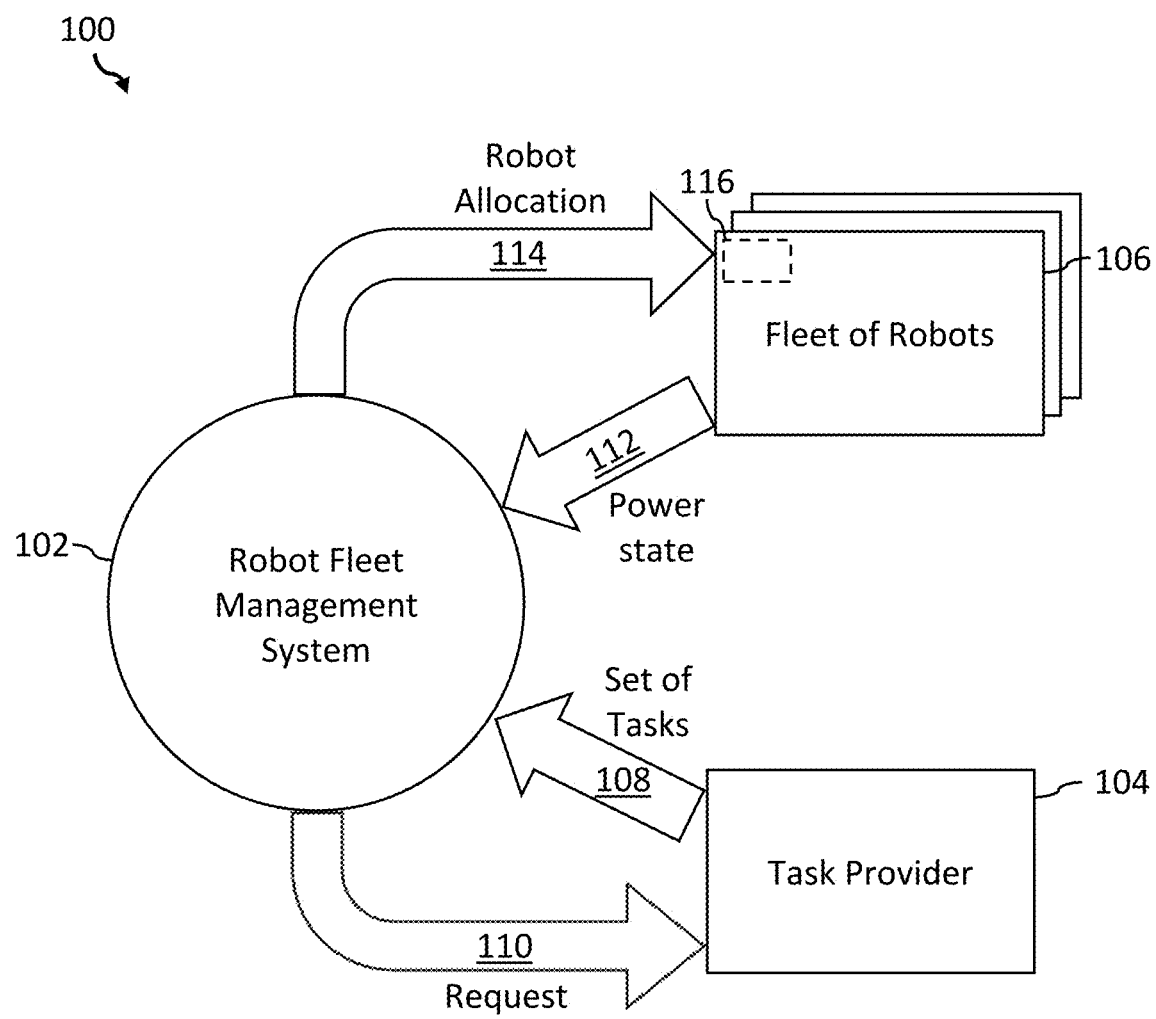
FIG. 1 is a schematic diagram of a context of an example implementation of a robot fleet management system, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

A robot generally includes, or is coupled to, at least one power source. A robot typically includes, or is electrically coupled to, an electrical power source. A hydraulic robot may include motors, pumps, sensors, controllers, and/or processors that are powered by one or more electrical power sources.

Some robots are mobile and can move from one task to another in their environment. Some tasks may be tethered tasks in which the robot is tethered to an electrical power source during at least a portion of the duration of the task. Other tasks may be untethered. For untethered tasks, the robot may rely on an onboard source of electrical power. The onboard source of electrical power may be, for example, a battery, a fuel cell, or a supercapacitor. Some on-board sources of electrical power rely on a charge or a fuel which is depleted over time, and consequently have a need for periodic recharging, replenishment, and/or replacement.

A fleet of robots may include robots operable to perform one or more tasks. In some implementations, robots in the fleet are of the same make and model of robot. In some implementations, robots in the fleet include general purpose robots. In some implementations, the fleet of robots includes at least one specialized robot.

The one or more tasks to be performed by robots in the fleet of robots may be performed concurrently, serially, in the same environment, or in different environments. The environment may include, for example, a place, a facility, and/or a work site.

Robots in the fleet may not have exactly the same specifications, functionality, and/or operational capability as one another. A fleet of robots may include ancillary systems and/or devices that are available to be shared by robots in the fleet and used in performance of tasks. Allocation of robots to tasks by a robot fleet management system may include allocation of the ancillary systems and/or devices, separately or in conjunction with the allocation of robots to tasks.

Managing fleets of robots, especially fleets of mobile robots, can present particularly complex scheduling challenges. For example, existing fleet management systems may not be well suited to fleets of robots, especially fleets of mobile robots with individual power requirements. Mobile robots may be tethered to a source of electrical power, or untethered and rely on an onboard source of electrical power, depending on the task performed. Existing scheduling approaches may not account for a variation in power requirements imposed by a diverse set of tasks, some of which may be tethered and others which may be untethered. This can lead to an inefficient allocation of robots in the fleet of robots to the set of tasks.

A mobile robot performing a tethered task (i.e., a mobile robot tethered to a source of electrical power) can draw electrical power used in performance of the task from the source of electrical power to which the mobile robot is tethered. While performing the task, and while powered by the source of electrical power, surplus electrical power from the source of electrical power can be used to replenish an energy storage device (e.g., a battery) onboard the mobile robot. In some implementations, a controller (e.g., a controller onboard the mobile robot) can prevent overcharging of the energy storage device, e.g., by temporarily using energy from the energy storage device to perform the task. Once sufficient energy from the energy storage device has been used, the controller can cause the mobile robot to return to drawing electrical power for performance of the task from the source of electrical power to which the mobile robot is tethered, using surplus power to replenish the energy storage device.

In some implementations, power available from the source of electrical power to which the mobile robot is tethered is at least sufficient to perform the tethered task to which the mobile robot is allocated. Surplus power from the source of electrical power can be used to replenish an energy storage device onboard the mobile robot. In some implementations, power available from the source of electrical power to which the mobile robot is tethered is insufficient to perform at least a portion of the tethered task to which the mobile robot is allocated. An energy storage device onboard the mobile robot can be used to provide additional power for performance of the tethered task.

An advantage of using a general-purpose robot to perform a task is that the robot can typically work longer hours than a human performing the same task. In some situations, the robot can perform a task without taking a break, e.g., 24/7. It can therefore be desirable for the robotic system to be operable to recharge, replenish, and/or replace a power source of the robot without causing a significant interruption to the robot's task, i.e., without causing the robot to be idle while the power source is recharged, replenished, and/or replaced.

An advantage of an autonomous robot is that it can operate with little or no human oversight, or intervention, during performance of the robot's task. It can be desirable for the robot to be similarly autonomous during recharging, replenishment, and/or replacement of an electrical power source.

It is desirable that the act of allocating robots to tasks includes a consideration of the power states of robots in a fleet of robots and the power consumptions of tasks in a set of tasks to which robots are allocated.

The "power state" of a robot refers to a) a power level at which the robot is able to provide electrical power for performance of a task, and/or b) a quantity of energy stored in the robot where the quantity of energy is available to be used for performance of a task. Performance of a task may include partial completion of a task, or performance of a task for a period of time. Performance of a task may include completion of a task.

The "power consumption" of a task refers to a) a quantity of energy consumed per unit time while performing the task, and/or b) a quantity of energy consumed to complete the task. The power consumption may be based at least in part on a quantity of energy per unit time and/or a total quantity of energy anticipated to be drawn by a robot in the fleet of robots from a power source to perform and/or complete the task. The power consumption may be based on historical power consumption data.

Allocation of robots to tasks by a scheduler in a robot fleet management system may include improving an efficiency with which a) tasks can be performed and b) high power states of robots in the fleet of robots can be maintained. It can, for example, be advantageous for a robot to be able to be productive while an electrical power source of the robot is being replaced, recharged, or replenished.

The technology described in the present application includes systems, devices, and methods for autonomous or semi-autonomous efficient allocation of robots in a fleet of robots to tasks.

FIG. 1 is a schematic diagram of a context 100 of an example implementation of a robot fleet management system 102, in accordance with the present systems, devices, and methods. Robot fleet management system 102 is described below with reference to FIG. 2. Context 100 includes a task provider 104, and a fleet of robots 106. In the example implementation of FIG. 1, task provider 104 and fleet of robots 106 are external to robot fleet management system 102. In other example implementations, task provider 104 is an element of robot fleet management system 102.

Robot fleet management system 102 is communicably coupled to task provider 104. In operation, robot fleet management system 102 access (e.g., receives) a set of tasks 108 from task provider 104. In some implementations, set of tasks 108 is retrieved by at least one processor of robot fleet management system 102 from a non-transitory processor-readable storage medium of task provider 104. In some implementations, set of tasks 108 is received (e.g., via a telecommunications interface) in response to a request 110 from robot fleet management system 102. In some implementations, set of tasks 108 is received periodically from task provider 104. In some implementations, set of tasks 108 is received in response to an external event. Set of tasks 108 may include a set of tethered tasks and a set of untethered tasks. Set of tasks 108 may include sufficient information to facilitate an allocation of robots in fleet of robots 106 to tasks from set of tasks 108.

Robot fleet management system 102 is communicably coupled to fleet of robots 106. Robot fleet management system 102 is operable to access (e.g., receive) a respective power state 112 of each robot in fleet of robots 106. In some implementations, power state 112 of a robot in fleet of robots 106 includes a state of charge of a battery onboard the robot.

In operation, robot fleet management system 102 allocates robots in fleet of robots 106 to tasks from set of tasks 108, and sends a robot allocation 114 to fleet of robots 106. Robot allocation 114 may include one or more allocations of robots in fleet of robots 106 to tasks from set of tasks 108. In some implementations, robot allocation 114 is sent directly to one or more robots in fleet of robots 106. In some implementations, robot allocation 114 is sent to one or more robots in fleet of robots 106 via an intermediate controller 116 in fleet of robots 106.

In some implementations, allocation of robots in fleet of robots 106 to tasks from set of tasks 108 is based at least in part on power state 112 of at least one robot in fleet of robots 106 and a power consumption for at least one task from set of tasks 108. In some implementations, the power consumption is based at least in part on a power anticipated to be drawn from a power source to complete the task. The power source may be a general-purpose alternating-current (AC) electric power supply. The power source may be a battery. The battery may be onboard the robot.

In some implementations, fleet of robots 106 includes a humanoid robot. A humanoid robot is a robot having an appearance and/or a character resembling that of a human.

Figure 2:
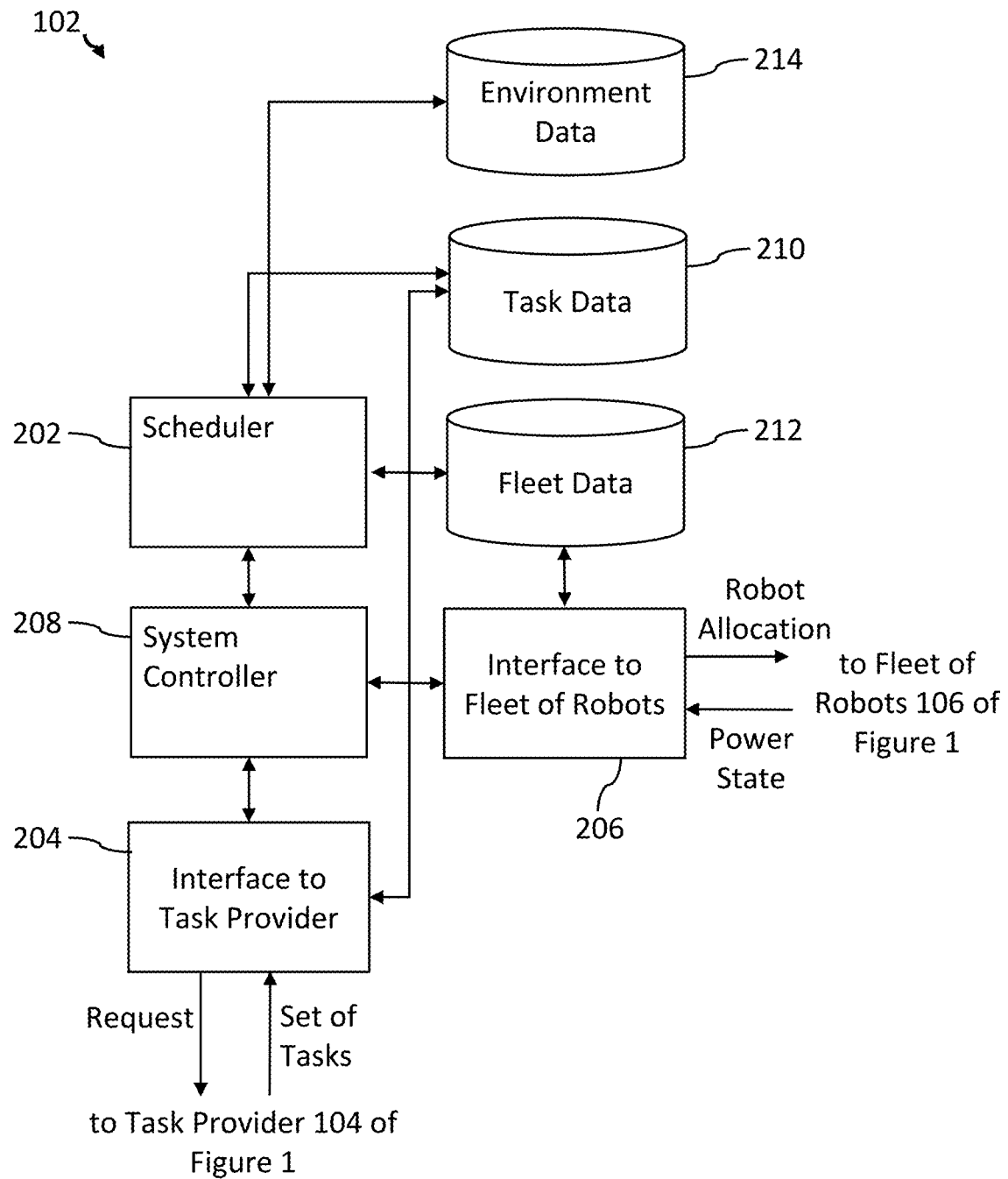
FIG. 2 is a block diagram of an example implementation of the robot fleet management system of FIG. 1, in accordance with the present systems, devices, and methods.

FIG. 2 is a block diagram of an example implementation of robot fleet management system 102 of FIG. 1, in accordance with the present systems, devices, and methods. Robot fleet management system 102 includes a scheduler 202, an interface 204 to a task provider (for example, task provider 104 of FIG. 1), an interface 206 to a fleet of robots (for example, fleet of robots 106 of FIG. 1), and a system controller 208.

System controller 208 is communicatively coupled to scheduler 202 and interfaces 204 and 206. System controller 208 may cause scheduler 202 to allocate robots in a fleet of robots to tasks in a set of tasks. System controller 208 may cause interface 204 to send a request to the task provider, and/or to receive a set of tasks from the task provider. System controller 208 may cause interface 206 to send a robot allocation to the fleet of robots, and/or to receive a power state from at least one robot in the fleet of robots.

Robot fleet management system 102 includes task data 210, fleet data 212, and environment data 214. Task data 210 may include one or more set(s) of tasks received via interface 204 from the task provider. Task data 210 may include data designating tasks as tethered tasks or untethered tasks. Task data 210 may include power consumption data for untethered tasks.

Fleet data 212 may include data about one or more robots in the fleet of robots. Fleet data 212 may include data designating robots as available or unavailable. Fleet data 212 may include a respective power state for each robot in the fleet of robots.

Environment data 214 may include data describing the environment, for example, a layout of a facility or workplace, numbers and locations of tethered stations (see, for example, FIG. 9 and its accompanying description), numbers and locations (if applicable) of untethered tasks, travel routes for robots in the environment, and the like.

Figure 3:
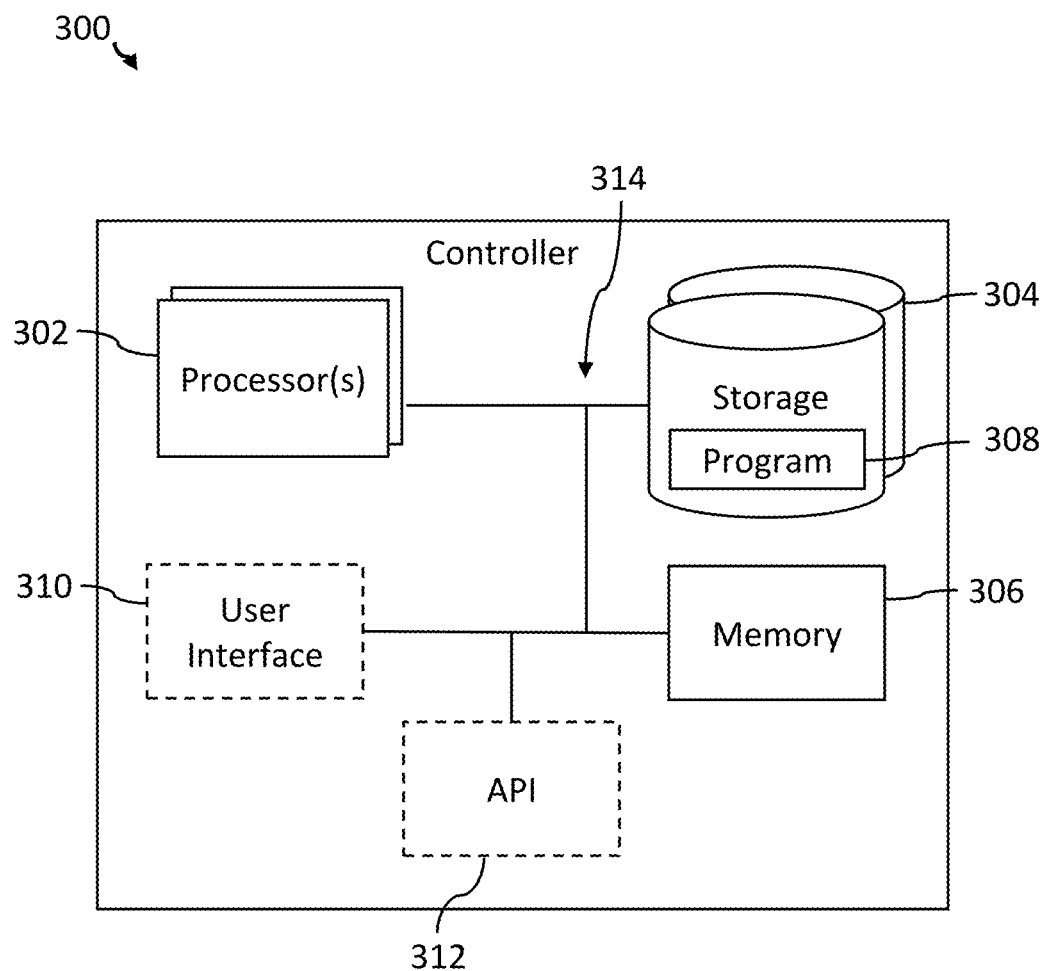
FIG. 3 is a block diagram of an example implementation of a controller of a robot fleet management system (for example, the robot fleet management system of FIGS. 1 and 2), in accordance with the present systems, devices, and methods.

FIG. 3 is a block diagram of an example implementation of a controller 300 of a robot fleet management system (e.g., robot fleet management system 102 of FIGS. 1 and 2), in accordance with the present systems, devices, and methods. Controller 300 may be a system controller (for example, system controller 208 of FIG. 2). Controller 300 may be a controller internal to scheduler 202 and/or interfaces 204 and 206. In various implementations, control functionality may be centralized or distributed.

Controller 300 includes one or more processors 302, one or more non-volatile storage media 304, and non-transitory memory 306. The one or more non-volatile storage media 304 include a computer program product 308.

Controller 300 optionally includes a user interface 310 and/or an application programming interface (API) 312.

The one or more processors 302, non-volatile storage media 304, non-transitory memory 306, user interface 310, and API 312 are communicatively coupled via a bus 314. Controller 300 may control and/or perform some or all of the acts of FIG. 7 and FIGS. 8A, 8B, 8C, and 8D (described below with reference to FIG. 7 and FIGS. 8A, 8B, 8C, and 8D).

Figure 4:
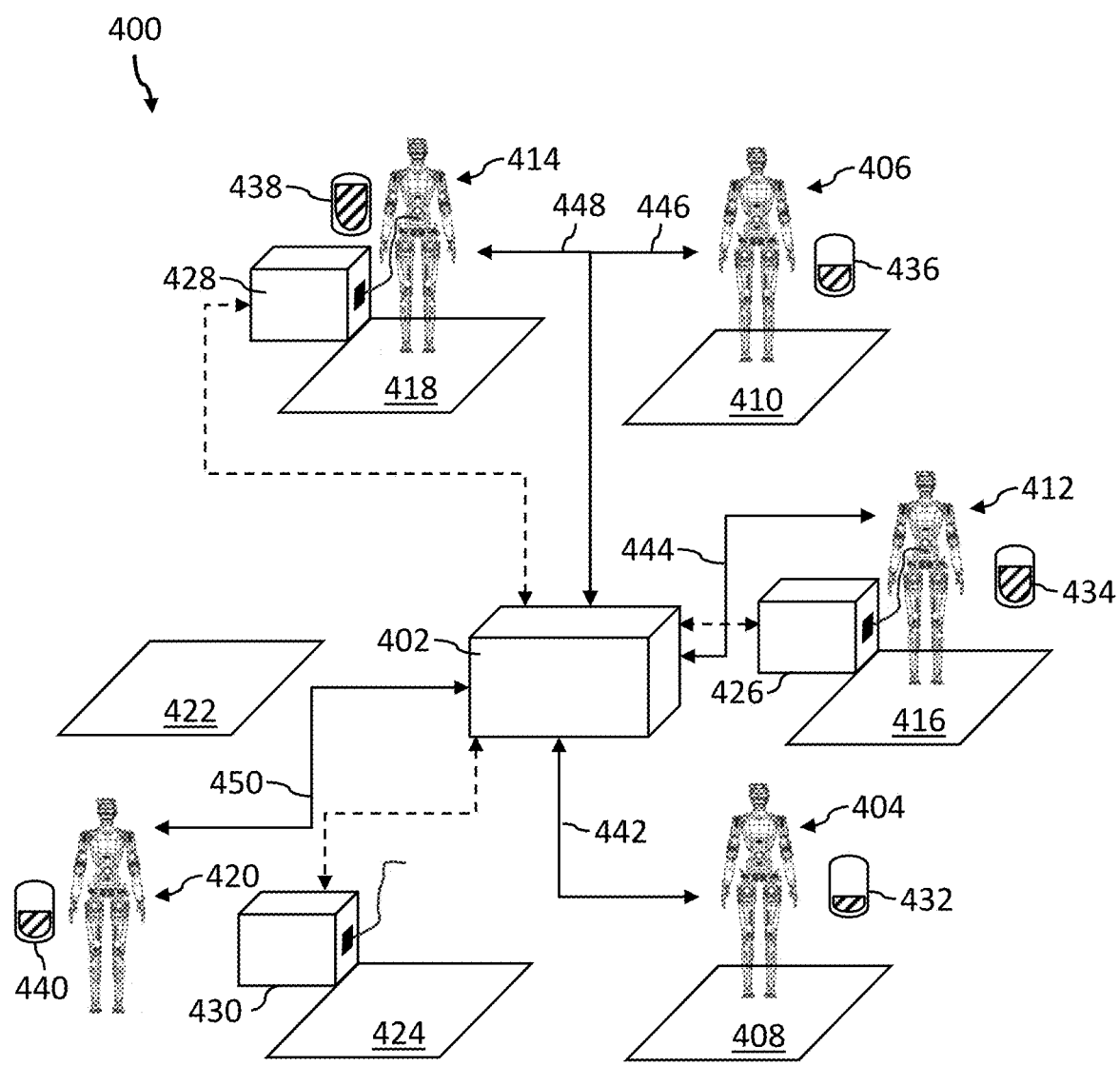
FIG. 4 is a schematic diagram of an environment that includes a robot fleet management system (for example, the robot fleet management system of FIGS. 1 and 2), in accordance with the present systems, devices, and methods.

FIG. 4 is a schematic diagram of an environment 400 that includes a robot fleet management system 402 (for example, robot fleet management system 102 of FIGS. 1 and 2), in accordance with the present systems, devices, and methods.

Environment 400 includes robots 404 and 406, each of which is performing an untethered task, tasks 408 and 410, respectively. Environment 400 also includes robots 412 and 414, each of which is performing a tethered task, tasks 416 and 418, respectively. Environment 400 further includes an unallocated robot 420 which is yet to be allocated to a task. Environment 400 further includes an untethered task 422 and a tethered task 424 neither of which has a robot presently allocated to them.

In some implementations, at least one of robots 404, 406, 412, 414, and 420 is a humanoid robot.

Each of tethered tasks 416, 418, and 424 includes an associated power station, power stations 426, 428, and 430, respectively. In some implementations, power stations 426 and 428 provide a source of electrical power to robots 412 and 414, respectively, while robots 412 and 414 are tethered to power stations 426 and 428, respectively, and performing tethered tasks 416 and 418, respectively. In some implementations, power stations 426 and 428 provide a replenishment of a power source onboard robots 412 and 414, respectively. In some implementations, at least one of power stations 426, 428, and 430 includes at least one of a general-purpose alternating-current (AC) electric power supply (for example, a mains electricity supply), a general-purpose direct-current (DC) electric power supply, a battery, a fuel cell, a supercapacitor, a power source recharging station, and a power source replacement station. Power stations 426, 428, and 430 are described in more detail with reference to FIG. 9.

Robot 420 may be allocated to untethered task 422 or tethered task 424 depending on a power state of robot 420 and a power consumption of untethered task 422. In some implementations, robot fleet management system 402 determines whether robot 420 has sufficient power to complete untethered task 422. If so, then robot fleet management system 402 allocates robot 420 to untethered task 422. If not, then robot fleet management system 402 allocates robot 420 to tethered task 424. This example implementation and various other example implementations for allocating a robot to a task are described in more detail with reference to FIG. 7 and FIGS. 8A, 8B, 8C, and 8D.

A power state of each of robots 404, 406, 412, 414, and 420 is illustrated schematically by meter displays 432, 434, 436, 438, and 440, respectively. For example, the power state of robot 414 is higher than the power state of robot 404. In some implementations, each of robots 414 and 404 include a respective battery, and meter displays 438 and 432 indicate that the battery of robot 414 is more fully charged than the battery of robot 404.

Robot fleet management system 402 is communicatively coupled to robots 404, 406, 412, 414, and 420, via communication links 442, 444, 446, 448, and 450, respectively. In some implementations, robot fleet management system 402 is in wireless communication with robots 404, 406, 412, 414, and 420, and communication links 442, 444, 446, 448, and 450 include wireless communication links. In some implementations, robot fleet management system 402 is also communicatively coupled to power stations 426, 428, and 430, e.g., by wireless communication, (indicated by dashed lines in FIG. 4). Robot fleet management system 402 may, for example, receive a status update from power stations 426, 428, and 430.

Figure 5:
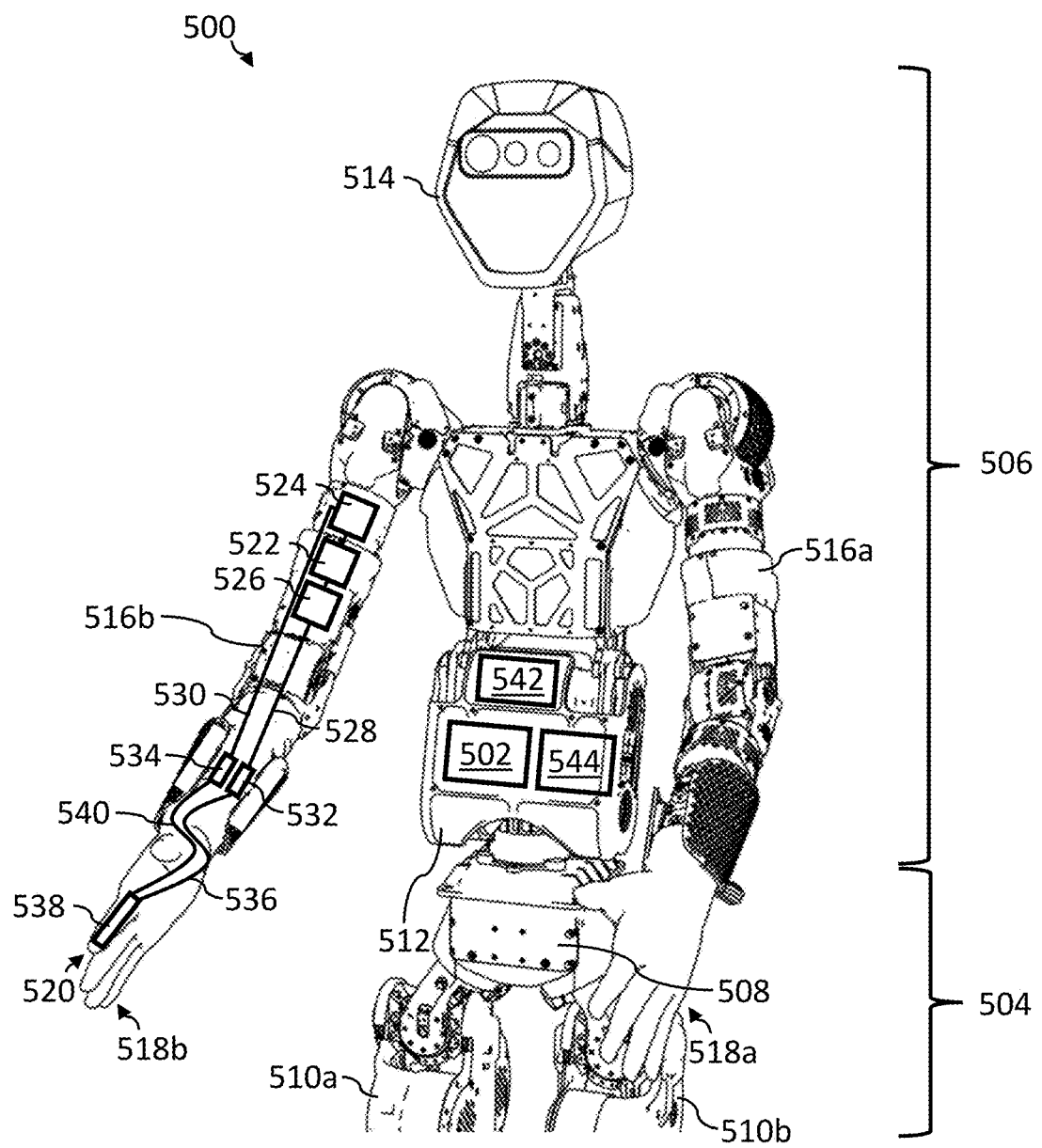
FIG. 5 is a schematic diagram of an example implementation of a robot in a fleet of robots (for example, the fleet of robots of FIG. 1), in accordance with the present systems, devices, and methods.

FIG. 5 is a schematic diagram of an example implementation of a robot 500 in a fleet of robots (for example, fleet of robots 106 of FIG. 1), in accordance with the present systems, devices, and methods. Robot 500 comprises an electrical power source 502. Electrical power source 502 may be at least of a battery, a fuel cell, or a supercapacitor.

Robot 500 further comprises a base 504 and a humanoid upper body 506. Base 504 comprises a pelvic region 508 and two legs 510a and 510b (collectively referred to as legs 510). Only the upper portion of legs 510 is shown in FIG. 5. In other example implementations, base 504 may comprise a stand and (optionally) one or more wheels. Upper body 506 comprises a torso 512, a head 514, a left-side arm 516a and a right-side arm 516b (collectively referred to as arms 516), and a left hand 518a and a right hand 518b (collectively referred to as hands 518). Arms 516 of robot 500 are also referred to in the present application as robotic arms. Arms 516 of robot 500 are humanoid arms. In other implementations, arms 516 have a form factor that is different from a form factor of a humanoid arm.

Hands 518 are also referred to in the present application as end effectors. In other implementations, hands 518 have a form factor that is different from a form factor of a humanoid hand. Each of hands 518 comprises one or more digits, for example, digit 520 of hand 518b. Digits may include fingers, thumbs, or similar structures of the hand or end effector.

In some implementations, robot 500 is a hydraulically-powered robot. Components of a hydraulic control system may be housed, for example, in base 504 and/or torso 512 of upper body 506. Components of the hydraulic control may also be located outside the robot, e.g., on a wheeled unit that rolls with the robot as it moves around, or in a fixed station to which the robot is tethered. In the implementation of FIG. 5, robot 500 includes a hydraulic pump 522, a reservoir 524, and an accumulator 526 integrated with arm 516b of robot 500.

Robot 500 further comprises hoses 528 and 530. Hose 528 provides a hydraulic coupling between accumulator 526 and a pressure valve 532. Hose 530 provides a hydraulic coupling between an exhaust valve 534 and reservoir 524. Robot 500 further comprises hose 536 which runs from pressure valve 532 to actuation piston 538, and hose 540 which runs to exhaust valve 534 from actuation piston 538. Hoses 528 and 536, and pressure valve 532, provide a forward path to actuation piston 538. Hoses 530 and 540, and exhaust valve 534 provide a return path from actuation piston 538. The hydraulic fluid in the hydraulic hoses of FIG. 5 (including hoses 528 and 530) can be an oil, for example, peanut oil or mineral oil.

Pressure valve 532 and exhaust valve 534 can control actuation piston 538, and can cause actuation piston 538 to move, which can cause a corresponding motion of at least a portion of hand 518b, for example, digit 520.

In some implementations, pressure valve 532 and exhaust valve 534 are electrohydraulic servo valves controlled by a controller 542. The electrohydraulic servo valves are also referred to in the present application as servo valves and servo-controlled valves. Controller 542 may be implemented by any suitable combination of hardware, software, and/or firmware. Controller 542 may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

Pump 522, pressure valve 532, and exhaust valve 534 are examples of components of the hydraulic control system of robot 500 that can be powered by electrical power source 502. Controller 542 is an example of an electronic system that can also be powered by electrical power source 502.

In other implementations, the hydraulic drive mechanism includes a motor and a drive piston. The motor and the drive piston are further examples of components of robot 500 that can be powered by electrical power source 502. In other implementations, robot 500 is an electromechanical robot. In yet other implementations, robot 500 is a cable-driven robot.

Electrical power source 502 may be a primary electrical power source. A primary electrical power source is an electrical power source used by robot 500 in normal operation to power electrical and/or electronic components of robot 500 (for example, pump 522 and controller 542).

FIG. 5 shows a single primary electrical power source 502. Those of skill in the art will appreciate that robot 500 may include more than one primary electrical power source. In some implementations, each primary electrical power source is dedicated to a respective designated subset of electrical or electronic components on robot 500. In some implementations, multiple primary power sources may be included to provide redundancy in the event of a failure of one primary power source.

Robot 500 also includes a secondary power source 544. A secondary power source of robot 500 (for example, secondary power source 544) is an electrical power source that can be engaged by robot 500 (or by another element of a robotic system of which robot 500 is a part) to maintain electrical power to electrical and/or electronic components of robot 500 when a primary electrical power source (for example electrical power source 502) is unavailable. The primary electrical power source may be unavailable, for example, when the present electrical power source is being swapped for a replacement primary electrical power source. The secondary power source may have a lower capacity than the primary power source. Secondary power source 544 may be a secondary battery, for example.

Figure 6:
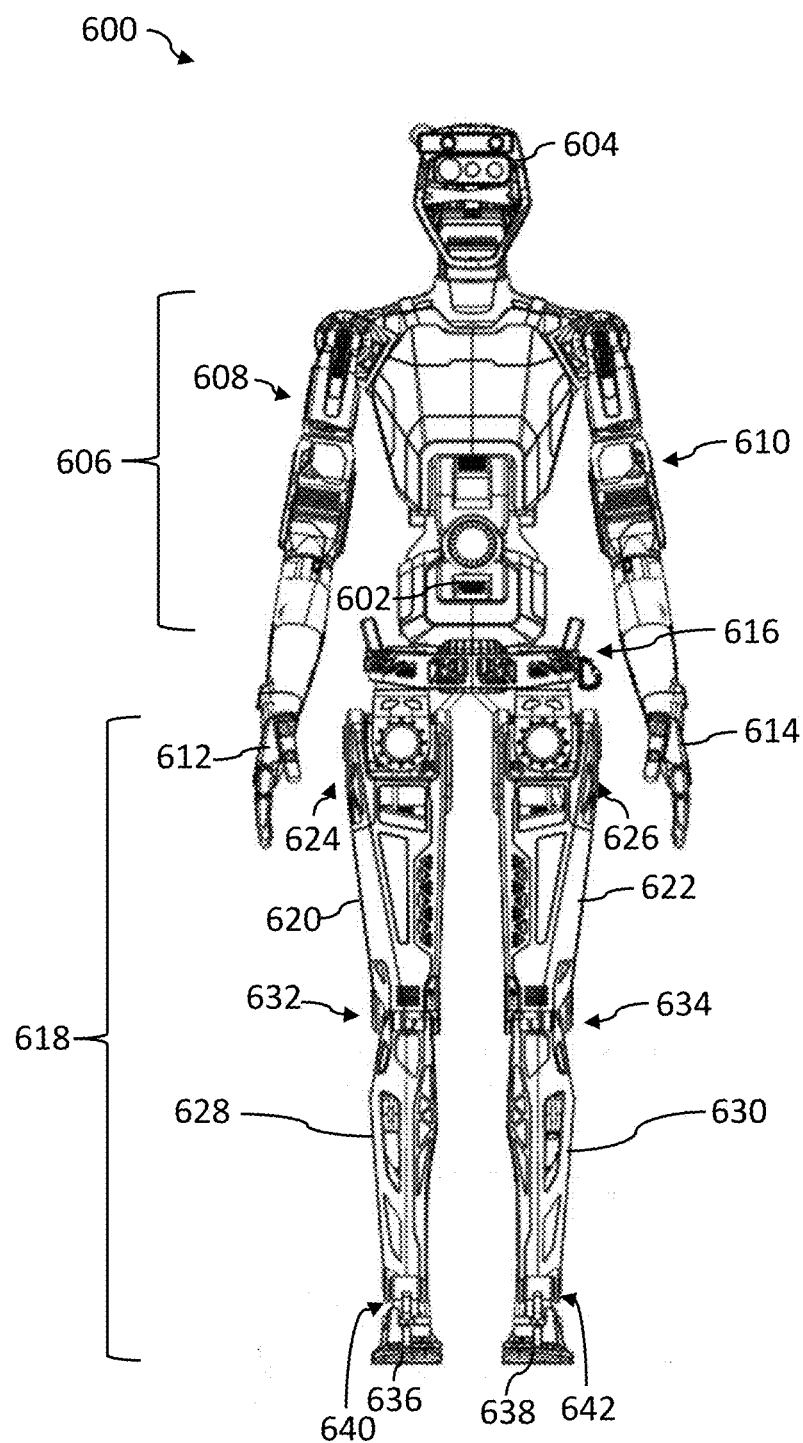
FIG. 6 is a schematic diagram of another example implementation of a robot in a fleet of robots (for example, the fleet of robots of FIG. 1), in accordance with the present systems, devices, and methods.

FIG. 6 is a schematic diagram of another example implementation of a robot 600 in a fleet of robots (for example, fleet of robots 106 of FIG. 1), in accordance with the present systems, devices, and methods. Robot 600 may be autonomous or semi-autonomous. Robot 600 may be a general-purpose robot. Robot 600 may be a robot in a fleet of robots.

Robot 600 includes an electrical power source 602. Electrical power source 602 may be at least of a battery, a fuel cell, or a supercapacitor.

Robot 600 is a humanoid robot. A humanoid robot is a robot having an appearance and/or a character resembling that of a human. In some implementations, robot 600 is capable of autonomous travel (for example, via bipedal walking).

Robot 600 includes a head 604, a torso 606, robotic arms 608 and 610, and hands 612 and 614. Robot 600 is a bipedal robot, and includes a joint 616 between torso 606 and robotic legs 618. Joint 616 may allow a rotation of torso 606 with respect to robotic legs 618. For example, joint 616 may allow torso 606 to bend forward.

Robotic legs 618 include upper legs 620 and 622 with hip joints 624 and 626, respectively. Robotic legs 618 also include lower legs 628 and 630, mechanically coupled to upper legs 620 and 622 by knee joints 632 and 634, respectively. Lower legs 628 and 630 are also mechanically coupled to feet 636 and 638 by ankle joints 640 and 642, respectively. In various implementations, one or more of hip joints 624 and 626, knee joints 632 and 634, and ankle joints 640 and 642 are actuatable joints.

Robot 600 may be a hydraulically-powered robot. In some implementations, robot 600 has alternative or additional power systems. In some implementations, torso 606 houses a hydraulic control system, for example. In some implementations, components of the hydraulic control system may alternatively be located outside the robot, for example, on a wheeled unit that rolls with the robot as it moves around, or in a fixed station to which the robot is tethered. The hydraulic control system of robot 600 may include a hydraulic pump, a reservoir, and/or an accumulator. Hydraulic hoses may provide hydraulic couplings between the hydraulic control system and one or more pressure valves.

In some implementations, robot 600 may be part of a mobile robot system that includes a mobile base. In some implementations, the robot is able to mount and dismount the mobile base. In some implementations, the mobile base includes wheels and/or tracks, and the robot is able to travel about the environment as a passenger while mounted on the mobile base. In some implementations, the robot is capable of bipedal walking, and able to travel about the environment independently of the mobile base while dismounted from the mobile base.

Robot 600 may include sensors, for example, auditory, visual, tactile, and/or olfactory sensors. Robot 600 may include a speech generator and/or a sound generator. Robot 600 can use the speech generator and/or the sound generator in an interaction with a human. The sensors may be used in performance of a task. The task may be an untethered task or a tethered task.

Figure 7:
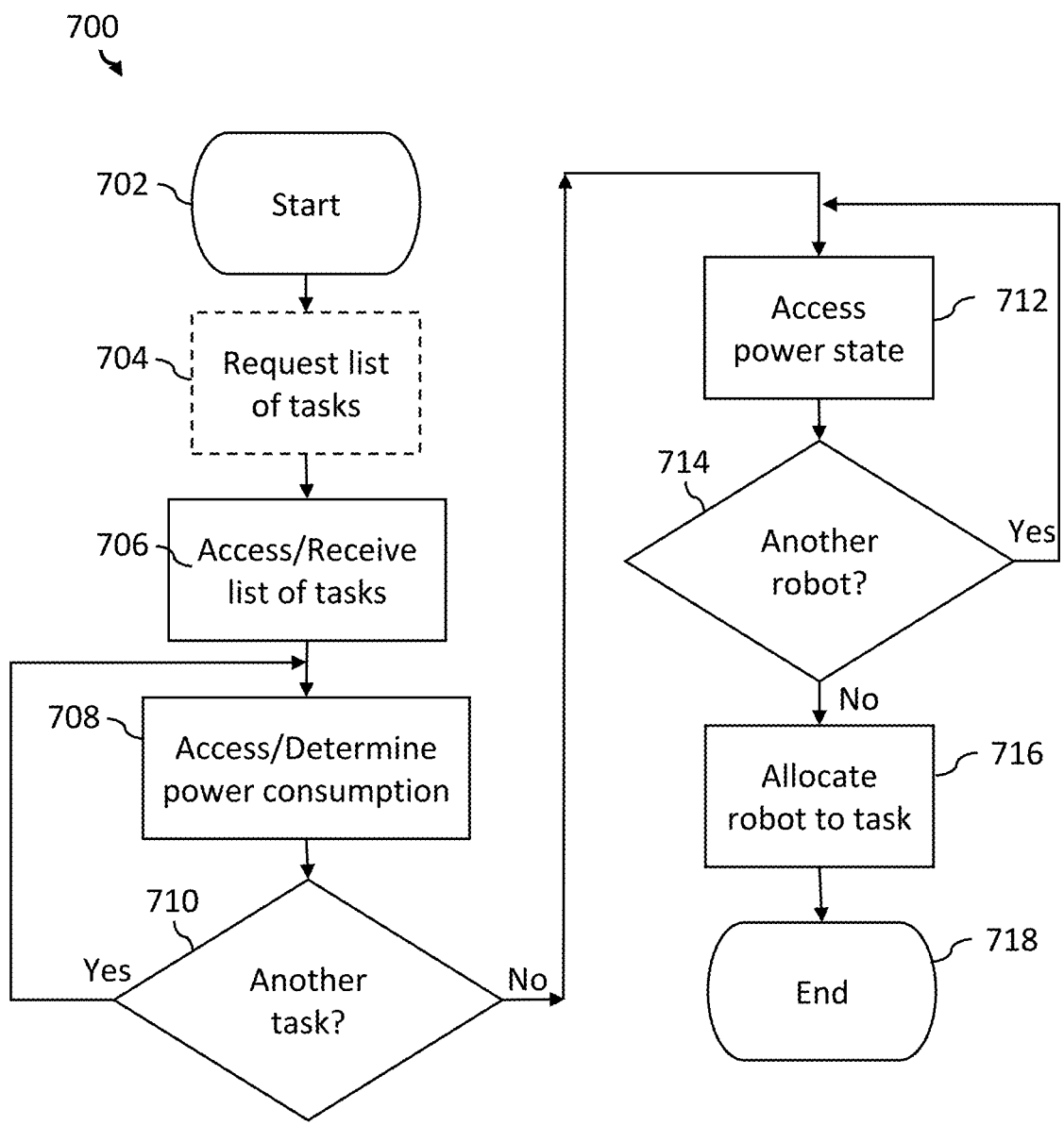
FIG. 7 is a flow diagram of an example implementation of a method of operation of a robot fleet management system (for example, the robot fleet management system of FIGS. 1 and 2), in accordance with the present systems, devices, and methods.

FIG. 7 is a flow diagram of an example implementation of a method 700 of operation of a robot fleet management system (for example, robot fleet management system 102 of FIGS. 1 and 2), in accordance with the present systems, devices, and methods. At 702, in response to a starting condition (for example, a controller powering up), the method starts. At 704, the robot fleet management system (optionally) requests a set of tasks (for example, a list of tasks) from a task provider (for example, task provider 104 of FIG. 1). At 706, the robot fleet management system accesses (e.g., receives) a set of tasks (for example, a list of tasks) from the task provider.

At 708, the robot fleet management system accesses (e.g., determines) a power consumption for a task from the set of tasks. For example, the set of tasks and their corresponding power consumptions may be stored in a non-transitory processor-readable storage medium (within or apart form the robot fleet management system) and in order to access the power consumption for a task, a processor of the robot fleet management system may retrieve the corresponding data from the non-transitory processor-readable storage medium. As another example, the power consumption may be accessed (e.g., determined, or at least estimated, by the processor of the robot fleet management system) based on power consumption data for the task from task data (for example, task data 210 of FIG. 2) stored in the robot fleet management system. In some implementations, power consumption data for a task is provided by the task provider. In some implementations, the set of tasks is ordered by power consumption (for example, in ascending or descending order). If, at 710, the robot fleet management system determines there is another task, method 700 returns to 708, and accesses/determines the power consumption for the next task.

Otherwise, method 700 proceeds to 712 where the robot fleet management system accesses a power state of a robot in a fleet of robots. The power state may be provided by the robot in the fleet of robots, or may be determined, or at least estimated, by the robot fleet management system based at least on data provided by the robot in the fleet of robots and/or fleet data (for example, fleet data 212 of FIG. 2) stored in the robot fleet management system. In some implementations, the power state may be determined by the robot fleet management system and/or the robot based at least in part on data from one or more sensors onboard the robot that monitor a power level of an onboard power source. In some implementations, the power state of a robot may be determined based at least in part on a record of the cumulative power drawn from the robot to complete various untethered tasks.

If, at 714, the robot fleet management system determines there is another robot, method 700 returns to 712, and determines the power state for the next robot.

Otherwise, method 700 proceeds to 716 where the robot fleet management system allocates each robot of at least one robot in the fleet of robots to a respective task from the set of tasks. At 718, method 700 ends, for example, when all the robots in the fleet of robots have been allocated to tasks or when the controller powers down.

FIGS. 8A, 8B, 8C, and 8D are flow diagrams of example implementations of methods of operation of a robot fleet management system (for example, robot fleet management system 102 of FIGS. 1 and 2) to allocate robots in a fleet of robots to tasks in a set of tasks, in accordance with the present systems, devices, and methods. FIGS. 8A, 8B, 8C, and 8D illustrate various example implementations of act 716 of FIG. 7 for allocating a robot to a task. The example implementations of FIGS. 8A, 8B, 8C, and 8D are referred to in the descriptions of the figures below as methods 716a, 716b, 716c, and 716d, respectively.

Figure 8A:
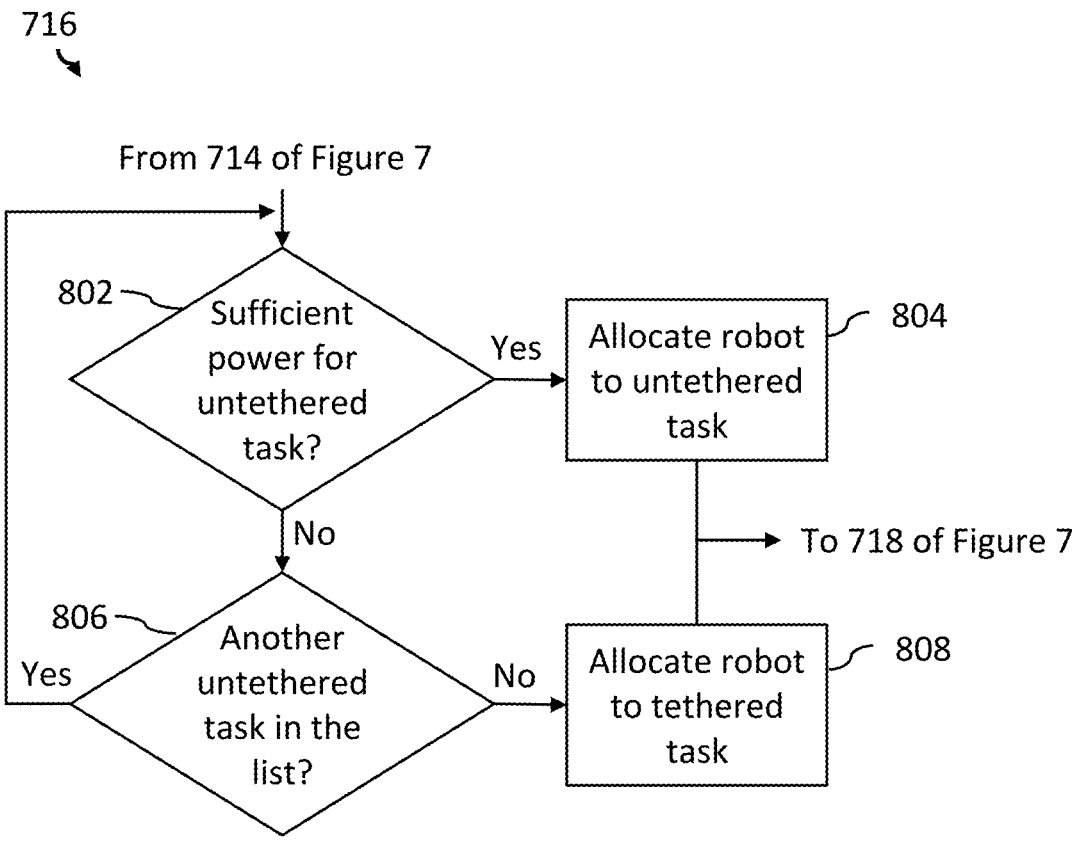
FIGS. 8A, 8B, 8C, and 8D are flow diagrams of example implementations of methods of operation of a robot fleet management system (for example, the robot fleet management system of FIGS. 1 and 2) to allocate robots in a fleet of robots to tasks in a set of tasks, in accordance with the present systems, devices, and methods.

FIG. 8A is a flow diagram of an example implementation (method 716a) of act 716 of FIG. 7 for allocating a robot to a task, in accordance with the present systems, devices, and methods.

Method 716a starts at 802. If, at 802, the robot fleet management system determines a robot has sufficient power for an untethered task, method 716a proceeds to 804 where the robot fleet management system allocates the robot to the untethered task, and returns control to 718 of FIG. 7. Otherwise, method 716a proceeds to 806. If, at 806, the robot fleet management system determines there is another untethered task in the set of tasks, then method 716a returns to 802. Otherwise, method 716a proceeds to 808 where the fleet management system allocates the robot to a tethered task, and returns control to 718 of FIG. 7.

Figure 8B:
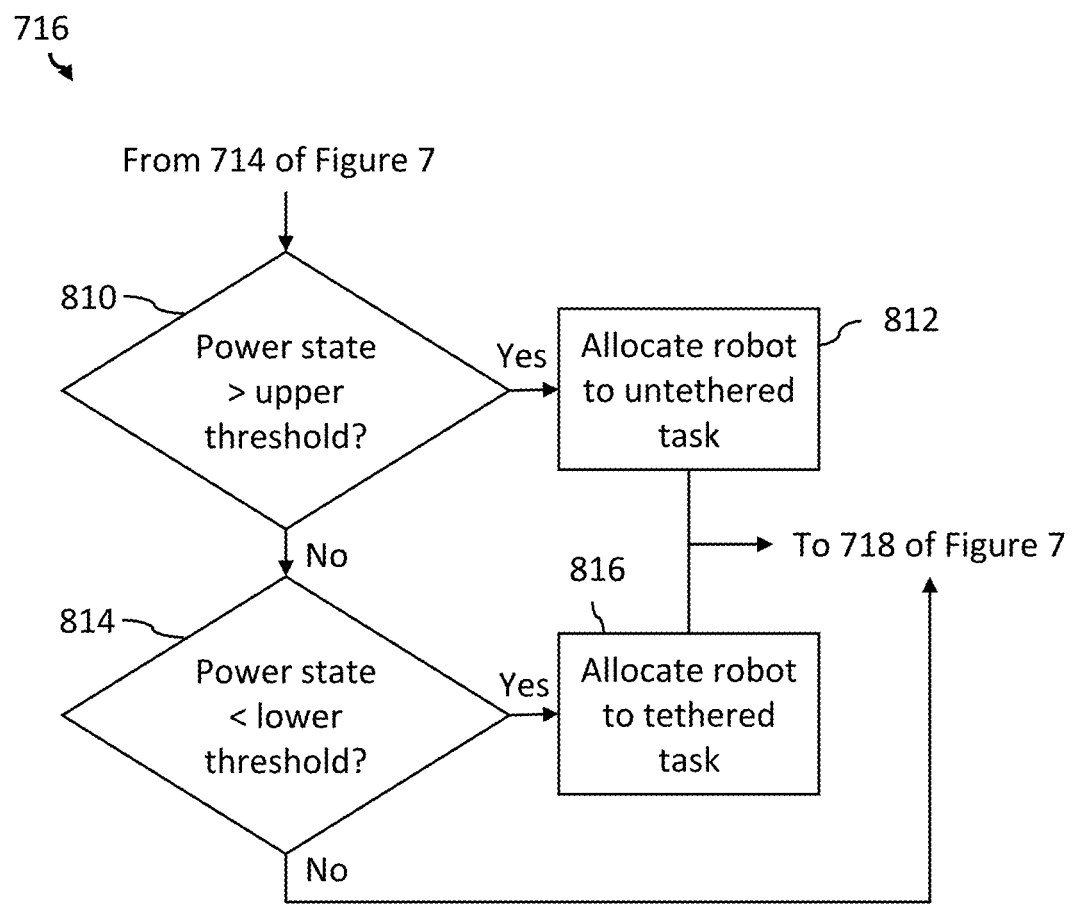

FIG. 8B is a flow diagram of another example implementation (method 716b) of act 716 of FIG. 7 for allocating a robot to a task, in accordance with the present systems, devices, and methods.

Method 716b starts at 810. If, at 810, the robot fleet management system determines a power state of a robot is greater than an upper threshold, method 716b proceeds to 812 where the robot fleet management system allocates the robot to an untethered task, and returns control to 718 of FIG. 7. Otherwise, method 716b proceeds to 814. If, at 814, the robot fleet management system determines the power state of the robot is less than a lower threshold, method 761b proceeds to 816 where the fleet management system allocates the robot to a tethered task, and returns control to 718 of FIG. 7. Otherwise, method 716b returns control directly to 718 of FIG. 7.

Figure 8C:
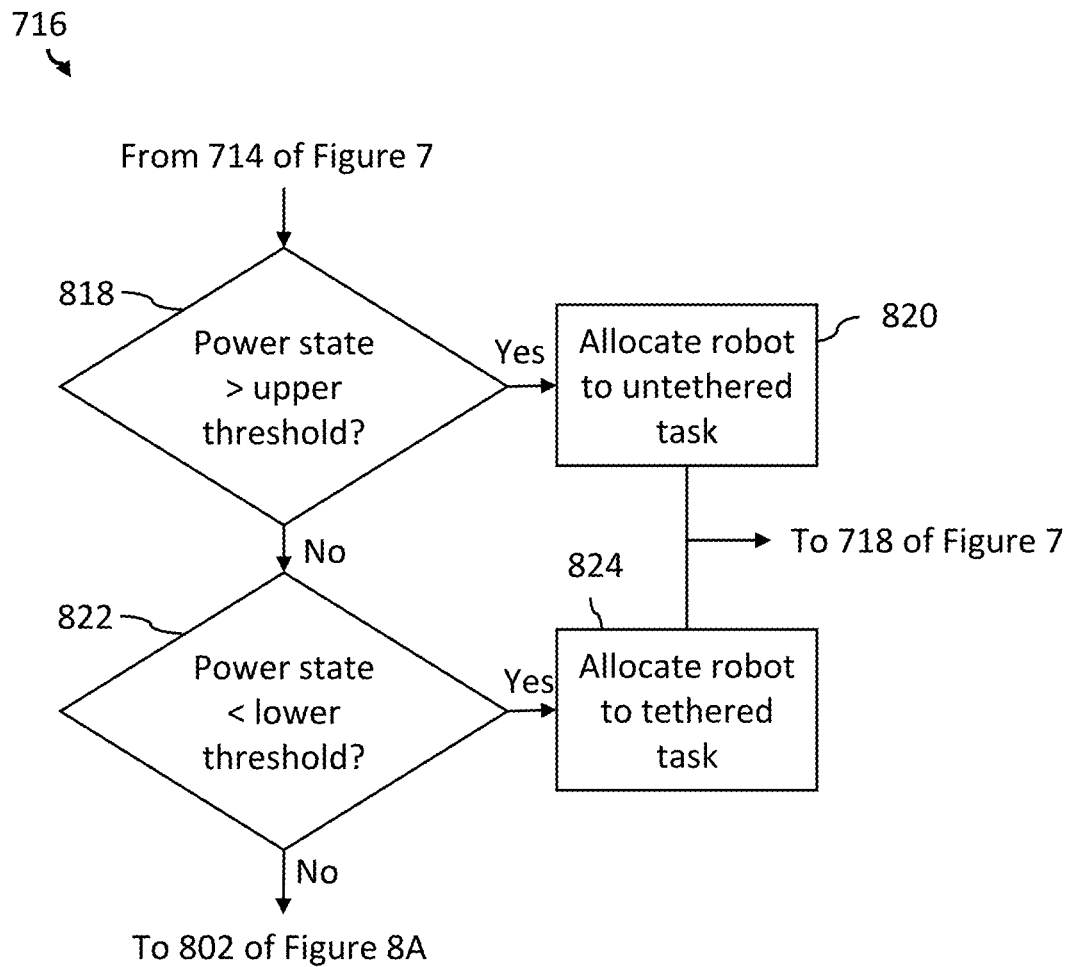

FIG. 8C is a flow diagram of yet another example implementation (method 716c) of act 716 of FIG. 7 for allocating a robot to a task, in accordance with the present systems, devices, and methods.

Method 716c starts at 818. If, at 818, the robot fleet management system determines a power state of a robot is greater than an upper threshold, method 716c proceeds to 820 where the robot fleet management system allocates the robot to an untethered task, and returns control to 718 of FIG. 7. Otherwise, method 716b proceeds to 822. If, at 822, the robot fleet management system determines the power state of the robot is less than a lower threshold, method 716c proceeds to 824 where the fleet management system allocates the robot to a tethered task, and returns control to 718 of FIG. 7. Otherwise, method 716c returns control directly to 802 of FIG. 8A where the robot is allocated to a task for which it has sufficient power to complete the task. Determining whether the robot has sufficient power to complete the task may be based at least in part on a power state of the robot and a power consumption of the task.

Figure 8D:
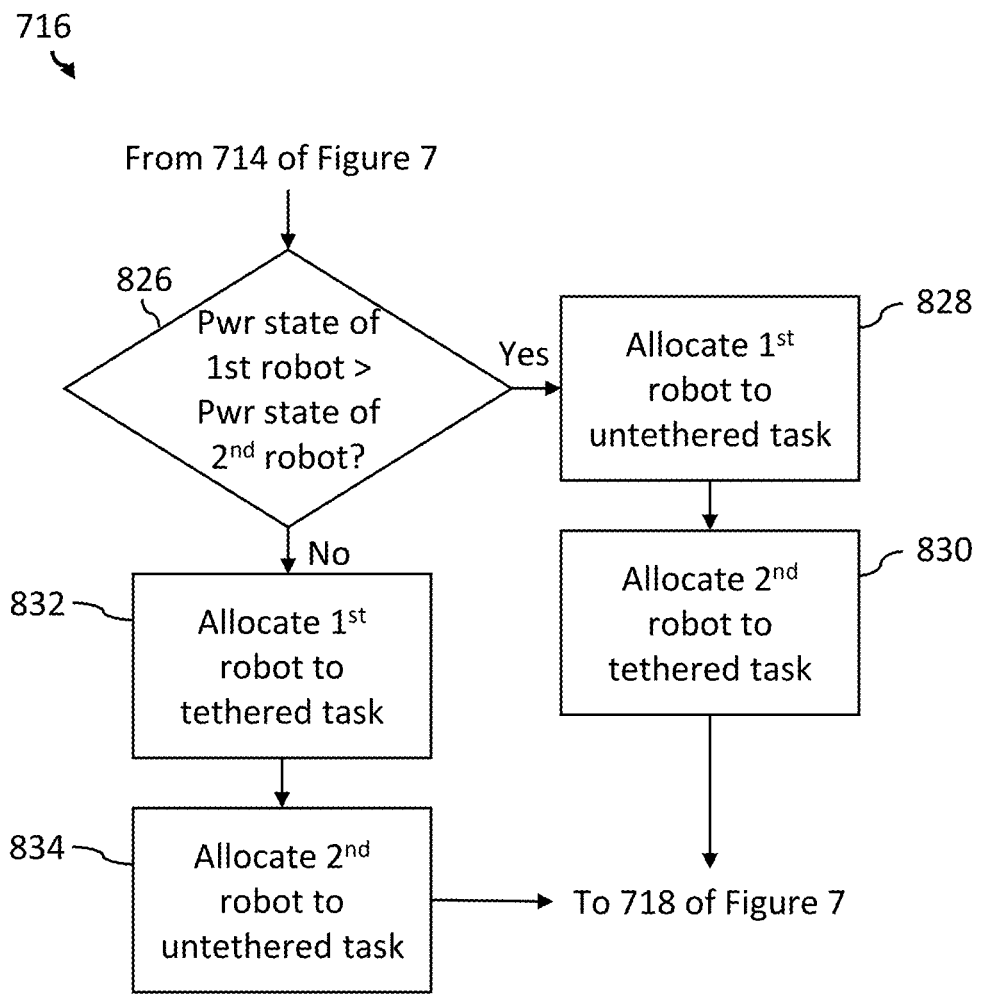

FIG. 8D is a flow diagram of yet another example implementation (method 716d) of act 716 of FIG. 7 for allocating a robot to a task, in accordance with the present systems, devices, and methods.

Method 716d starts at 826. If, at 826, the robot fleet management system determines a power state of a first robot is greater than a power state of a second robot, method 716d proceeds to 828 where the robot fleet management system allocates the first robot to an untethered task. At 830, the robot fleet management system allocates the second robot to a tethered task, and then returns control to 718 of FIG. 7. Otherwise, method 716d proceeds to 832. At 832, the robot fleet management system allocates the first robot to a tethered task. At 834, the robot fleet management system allocates the second robot to an untethered task, and then returns control to 718 of FIG. 7.

In some implementations, the methods of operation of the robot fleet management system described with reference to FIGS. 7, 8A, 8B, 8C, and 8D are performed in real time or near real time.

In some implementations, the robot fleet management system includes additional considerations in scheduling and allocation of robots to tasks. For example, in some implementations, allocation of a robot to a task is based at least in part on at least one of a priority of the task relative to other tasks from the set of tasks and a maintenance condition of the robot.

Figure 9:
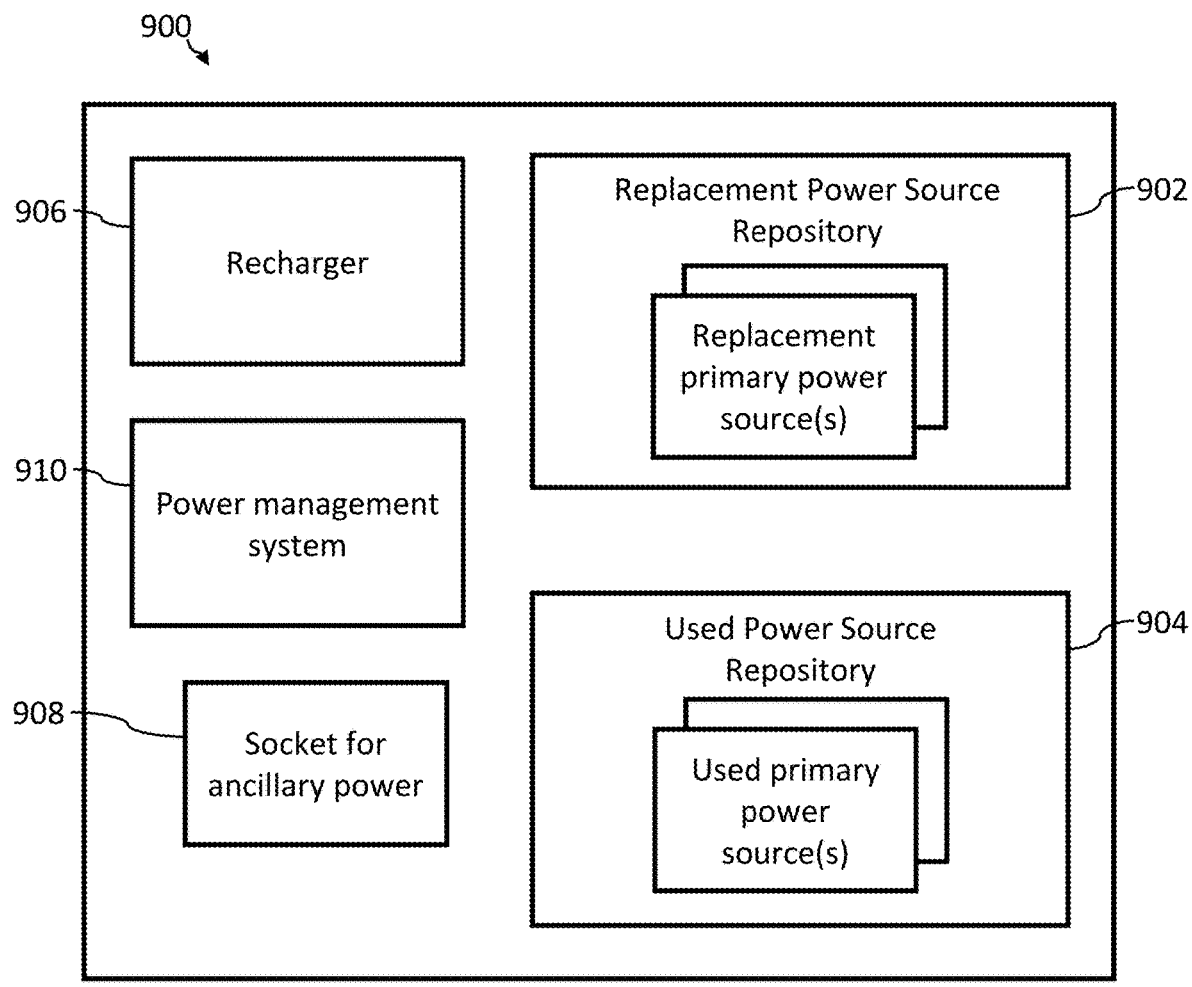
FIG. 9 is a block diagram of an example implementation of a power station for a tethered task, in accordance with the present systems, devices, and methods.

FIG. 9 is a block diagram of an example implementation of a power station 900 for a tethered task (for example, power station 426 of FIG. 4), in accordance with the present systems, devices, and methods.

When a robot is allocated to a tethered task, the power source of the robot may be replaced and/or recharged while the robot is performing the tethered task. Power station 900 includes a replacement power source repository 902 which includes one or more replacement electrical power sources compatible with the robot (for example, robots 500 and 600 of FIGS. 5 and 6, respectively). Power station 900 also includes a used power source repository 904 which includes one or more used, depleted, or discharged electrical power sources received from robots in the fleet of robots.

Power station 900 may include a recharger. The recharger may be suitable for recharging an electrical power source (for example, a battery) from a robot in the fleet of robots.

Power station 900 may include a socket 908 for ancillary electrical power. Socket 908 may provide at least one of AC power and DC power. Socket 908 may be used to provide power to a robot a) while the robot is exchanging a power source with power source exchange station 900, b) while the robot is recharging (or otherwise waiting for) a primary power source, and/or c) while the robot is performing the tethered task.

Power station 900 may include a power management system 910. Power management system 910 may include at least one processor. In some implementations (for example, when the robot is unable to identify for itself a condition of the robot's power source), power management system 910 may be used to assess a power state of a robot (for example, a low-power condition or a state of charge). Power management system 910 may be used to provide an automated exchange of the electrical power source of the robot and/or an automated recharging of the electrical power source of the robot. The automatic exchange and/or recharging may include engaging and disengaging a source of ancillary power to maintain power to the robot during the exchange, and/or while the robot is performing the tethered task.

Power station 900 may be a mobile or a fixed station. In some implementations, the robot is mobile, and the power station is at a fixed location. In some implementations, the power station is mobile and able to be directed to a robot that has a present or impending low-power condition. The robot may be performing an untethered or a tethered task when the impending low-power condition is first detected.

Figure 10:
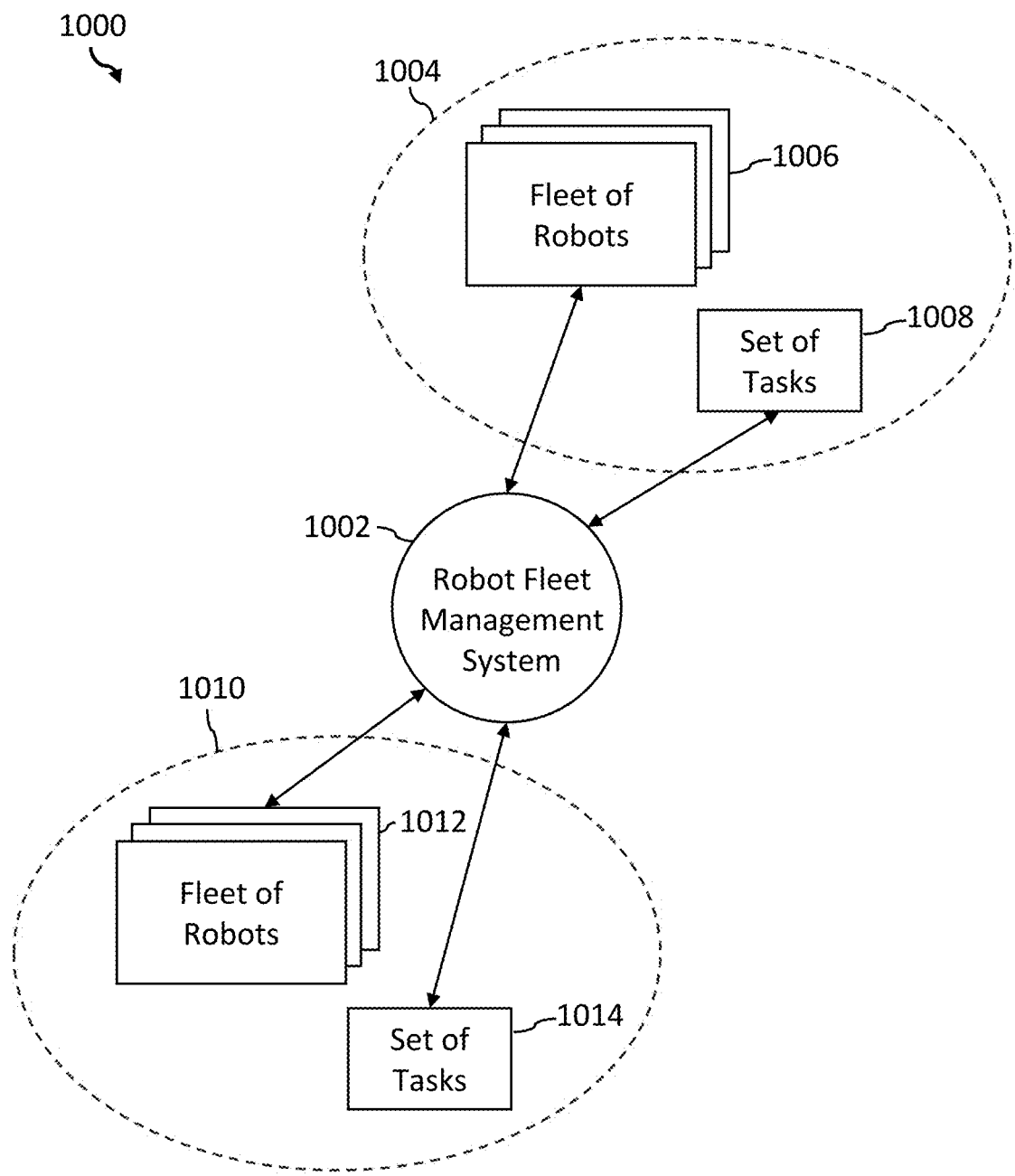
FIG. 10 is a schematic diagram of a context of another example implementation of a robot fleet management system, in accordance with the present systems, devices, and methods.

FIG. 10 is a schematic diagram of a context 1000 of another example implementation of a robot fleet management system 1002, in accordance with the present systems, devices, and methods.

Robot fleet management system 1002 is similar to robot fleet management system 102 of FIG. 1, and is described in more detail above with reference to FIG. 2. Context 1000 includes an environment 1004 that includes a fleet of robots 1006 and a set of tasks 1008. Environment 1004 may include at least one of a place, a facility, a workplace, and the like. Robot fleet management system 1002 is communicatively coupled to fleet of robots 1006. Robot fleet management system 1002 is operable to access/receive set of tasks 1008.

Context 1000 also includes an environment 1010 that includes a fleet of robots 1012 and a set of tasks 1014. Environment 1010 may include at least one of a place, a facility, a workplace, and the like. Robot fleet management system 1002 is communicatively coupled to fleet of robots 1012. Robot fleet management system 1002 is operable to access/receive set of tasks 1014.

Sets of tasks 1008 and 1014 may be accessed/received by robot fleet management system 1002 from one or more task providers (not shown in FIG. 10). Sets of tasks 1008 and 1014 may include tethered tasks and untethered tasks. Sets of tasks 1008 and 1014 may include sufficient information to facilitate an allocation of robots in fleets of robots 1006 and 1012, respectively, to tasks.

In operation, robot fleet management system 1002 allocates robots in fleets of robots 1006 and 1012 to tasks in sets of tasks 1008 and 1014, respectively.

Methods of operation of robot fleet management system 1002 are described with reference to FIGS. 7, 8A, 8B, 8C, and 8D above.

In some implementations, robots in fleets of robots 1006 and 1012 are humanoid robots.

The various implementations described herein may include, or be combined with, any or all of the systems, devices, and methods described in U.S. patent application Ser. Nos. 18/089,517, 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/316,693, U.S. Provisional Patent Application Ser. No. 63/253,591, U.S. Provisional Patent Application Ser. No. 63/293,968, U.S. Provisional Patent Application Ser. 63/293,973, and/or U.S. Provisional Patent Application Ser. No. 63/278,817, each of which is incorporated herein by reference in its entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operation of a robot fleet management system, the method comprising:
   accessing, by the robot fleet management system, a set of tasks available to be performed by a fleet of robots;
   accessing, by the robot fleet management system, a respective power consumption for each task from the set of tasks;
   accessing, by the robot fleet management system, a respective power state of each robot in the fleet of robots; and
   allocating, by the robot fleet management system, a first robot in the fleet of robots to a first task from the set of tasks, based at least in part on the power state of at least the first robot and the power consumption for at least the first task.

2. The method of claim 1, wherein allocating, by the robot fleet management system, a first robot in the fleet of robots to a first task from the set of tasks includes allocating, by the robot fleet management system, a first robot in the fleet of robots to a first task from the set of tasks based at least in part on the respective power state of each robot in the fleet of robots and the respective power consumption for each task from the set of tasks.

3. The method of claim 1, wherein accessing, by the robot fleet management system, a set of tasks available to be performed by a fleet of robots includes accessing, by the robot fleet management system, a set of tasks comprising at least one tethered task and at least one untethered task.

4. The method of claim 3, wherein allocating, by the robot fleet management system, a first robot in the fleet of robots to a first task from the set of tasks based at least in part on the power state of at least the first robot and the power consumption for at least the first task includes:
   determining, by the robot fleet management system, the first robot has sufficient power to complete an untethered task selected from the at least one untethered task, and
   allocating, by the robot fleet management system, the first robot to the selected untethered task.

5. The method of claim 3, wherein allocating, by the robot fleet management system, a first robot in the fleet of robots to a first task from the set of tasks, based at least in part on the power state of at least the first robot and the power consumption for at least the first task includes:
   determining, by the robot fleet management system, the power state of the first robot is above an upper threshold; and
   allocating, by the robot fleet management system, the first robot in the fleet of robots to an untethered task selected from the at least one untethered task.

6. The method of claim 3, wherein allocating, by the robot fleet management system, a first robot in the fleet of robots to a first task from the set of tasks based at least in part on the power state of at least the first robot and the power consumption for at least the first task includes:
   determining, by the robot fleet management system, the first robot has insufficient power to complete an untethered task selected from the at least one untethered task; and
   allocating, by the robot fleet management system, the first robot to a tethered task selected from the at least one tethered task.

7. The method of claim 3, wherein allocating, by the robot fleet management system, a first robot in the fleet of robots to a first task from the set of tasks based at least in part on the power state of at least the first robot and the power consumption for at least the first task includes:
   determining, by the robot fleet management system, the first robot has insufficient power to complete any untethered task selected from the at least one untethered task; and
   allocating, by the robot fleet management system, the first robot to a tethered task selected from the at least one tethered task.

8. The method of claim 3, wherein allocating, by the robot fleet management system, a first robot in the fleet of robots to a first task from the set of tasks, based at least in part on the power state of at least the first robot and the power consumption for at least the first task includes:
   determining, by the robot fleet management system, the power state of the first robot is below a lower threshold; and
   allocating, by the robot fleet management system, the first robot in the fleet of robots to a tethered task selected from the at least one tethered task.

9. The method of claim 3, further comprising initiating, by the robot fleet management system, a replenishment of a power source of the first robot during performance of a tethered task by the first robot.

10. The method of claim 1, wherein accessing, by the robot fleet management system, a respective power consumption for each task from the set of tasks includes accessing, by the robot fleet management system, a respective power consumption based at least in part on a power anticipated to be drawn by a robot in the fleet of robots from a power source to complete each task from the set of tasks.

11. The method of claim 10, wherein accessing, by the robot fleet management system, a respective power consumption based at least in part on a power anticipated to be drawn by a robot in the fleet of robots from a power source to complete each task from the set of tasks includes accessing, by the robot fleet management system, a respective power consumption based at least in part on an anticipated power to be drawn from a battery to complete each task from the set of tasks, the battery onboard a battery-powered robot in the fleet of robots.

12. The method of claim 1, wherein accessing, by the robot fleet management system, a respective power consumption for each task from the set of tasks includes accessing, by the robot fleet management system, a respective power consumption based at least in part on respective historical power consumption data for each task from the set of tasks.

13. The method of claim 1, wherein accessing, by the robot fleet management system a respective power consumption for each task from the set of tasks includes accessing, by the robot fleet management system, at least one of a respective power consumption score and a power consumption category for each task from the set of tasks.

14. The method of claim 1, wherein accessing, by the robot fleet management system, a respective power state of each robot in the fleet of robots includes accessing, by the robot fleet management system, a respective state of charge of a battery onboard each robot in the fleet of robots.

15. The method of claim 1, wherein accessing, by the robot fleet management system, a respective power state of each robot in the fleet of robots includes determining a respective power state of each robot based at least in part on a respective cumulative power consumption of each robot for a respective at least one completed task of the at least one untethered tasks.

16. The method of claim 1, further comprising allocating, by the robot fleet management system, a second robot in the fleet of robots to a second task from the set of tasks based at least in part on the respective power state of at least the second robot and the respective power consumption for at least the second task.

17. The method of claim 16, wherein allocating, by the robot fleet management system, a second robot in the fleet of robots to a second task from the set of tasks includes allocating, by the robot fleet management system, a second robot in the fleet of robots to a second task from the set of tasks based at least in part on the respective power state of each robot in the fleet of robots and the respective power consumption for each task from the set of tasks.

18. The method of claim 16, wherein:
accessing, by the robot fleet management system, a set of tasks available to be performed by a fleet of robots includes accessing, by the robot fleet management system, a set of tasks comprising at least one tethered task and at least one untethered task, and
allocating, by the robot fleet management system, a first robot in the fleet of robots to a first task from the set of tasks and allocating, by the robot fleet management system, a second robot in the fleet of robots to a second task from the set of tasks includes:
determining, by the robot fleet management system, the power state of the first robot is lower than the power state of the second robot;
allocating, by the robot fleet management system, a tethered task selected from the at least one tethered task to the first robot; and
allocating, by the robot fleet management system, an untethered task selected from the at least one untethered task to the second robot.

19. The method of claim 1, wherein allocating, by the robot fleet management system, a first robot in the fleet of robots to a first task from the set of tasks, based at least in part on the power state of at least the first robot and the power consumption for at least the first task includes allocating, by the robot fleet management system, the first robot to the first task based at least in part on at least one of a priority of the first task relative to other tasks from the set of tasks and a maintenance condition of the first robot.

20. The method of claim 1, wherein allocating, by the robot fleet management system, a first robot in the fleet of robots to a first task from the set of tasks, based at least in part on the power state of at least the first robot and the power consumption for at least the first task includes allocating, by the robot fleet management system, a first task from the set of tasks to a first robot of the fleet of robots in real-time.

* * * * *